US010242209B2

(12) United States Patent
Rooney et al.

(10) Patent No.: US 10,242,209 B2
(45) Date of Patent: Mar. 26, 2019

(54) TASK SCHEDULING ON HYBRID CLOUDS USING ANONYMIZATION

(71) Applicant: International Business Machines Corporation, Armonk, NY (US)

(72) Inventors: John G. Rooney, Zurich (CH); Patrick M. Stuedi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/837,122

(22) Filed: Aug. 27, 2015

(65) Prior Publication Data

US 2017/0061143 A1     Mar. 2, 2017

(51) Int. Cl.
*G06F 9/48* (2006.01)
*G06F 21/62* (2013.01)

(52) U.S. Cl.
CPC ........ *G06F 21/6209* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 8,032,846 B1 | 10/2011 | Balasubramanian et al. | |
| 8,769,613 B2* | 7/2014 | Latchem ............. | G06F 21/6245 726/27 |
| 2013/0073724 A1 | 3/2013 | Parashar et al. | |
| 2013/0283364 A1* | 10/2013 | Chang ...................... | H04L 49/70 726/12 |
| 2014/0075183 A1 | 3/2014 | Wang et al. | |
| 2014/0123325 A1* | 5/2014 | Jung ................... | G06F 21/6254 726/30 |
| 2014/0372149 A1* | 12/2014 | Friese .................... | G06Q 10/10 705/3 |
| 2015/0046600 A1* | 2/2015 | Kim .................... | H04L 67/1095 709/232 |
| 2015/0215332 A1* | 7/2015 | Curcic ................ | H04L 63/1433 726/25 |
| 2015/0254474 A1* | 9/2015 | Nelke .................. | G06F 21/6254 726/26 |

(Continued)

OTHER PUBLICATIONS

Zhang et al., "Sedic: Privacy-Aware Data Intensive Computing on Hybrid Clouds," Proceedings of the 18th ACM conference on Computer and communications security, Oct. 17-21, 2011, pp. 515-525, Copyright 2011 ACM DOI: 10.1145/2046707.2046767.

*Primary Examiner* — Trang T Doan
(74) *Attorney, Agent, or Firm* — Nolan M. Lawrence

(57) ABSTRACT

Task scheduling in a hybrid cloud that includes a private cloud and an external cloud is performed. First a job to be performed is identified. Then, the job identified is decomposed into a set of tasks, whereby a task schedule is obtained for tasks of the set of tasks to be executed across the hybrid cloud. Next, a task to be executed in the external cloud that requires private data from the private cloud for its execution is detected from the task schedule. Finally, one or more non-anonymized portions of the private data are anonymized before execution of the detected task in the external cloud, by executing an anonymizing function from the private cloud. De-anonymization functionality may similarly be involved.

20 Claims, 3 Drawing Sheets

(56) References Cited

U.S. PATENT DOCUMENTS

| | | | | |
|---|---|---|---|---|
| 2015/0295731 A1* | 10/2015 | Bagepalli | ............ | H04L 12/6418 |
| | | | | 370/401 |
| 2015/0334155 A1* | 11/2015 | Bragstad | ............... | H04L 47/805 |
| | | | | 709/219 |
| 2015/0381435 A1* | 12/2015 | Todd | ........................ | H04L 67/10 |
| | | | | 709/223 |
| 2016/0044035 A1* | 2/2016 | Huang | ................ | H04L 63/0272 |
| | | | | 726/4 |
| 2016/0292455 A1* | 10/2016 | Jebara | ............... | G06F 17/30867 |
| 2017/0134301 A1* | 5/2017 | Chen | ........................ | H04L 67/10 |

\* cited by examiner

TASK SCHEDULING ON HYBRID CLOUDS USING ANONYMIZATION

BACKGROUND

The present disclosure relates in general to the field of computer-implemented methods and systems for scheduling tasks across a hybrid cloud. In particular, present methods and systems involve anonymization of data for selected tasks performed across the hybrid cloud.

A cloud is a set of computer resources organized in such a way that the owner of the resources may dynamically allocate part or all of those resources to users, e.g., for a fixed period of time. A private cloud may refer to a cloud in which the user and owner belong to the same organization while in an external cloud, also referred to as public cloud herein, may refer to a cloud wherein the user and owner belong to different organizations. Private clouds tend to be preferred when owners or users do not wish to have their computation performed on the infrastructure of a third party, e.g., for reasons of security or reliability. Private clouds tend to have the disadvantage of being inelastic, e.g., the amount of resources that can be allocated to task may be bound by the total amount of resources in the private cloud, which is likely more limited than the amount of resources in a public cloud. Hybrid clouds may attempt to federate private and public clouds such that part of users requirements are performed in a private cloud while others are performed in a public cloud.

SUMMARY

According to a first aspect, the present disclosure is embodied as a computer-implemented method of task scheduling in a hybrid cloud that comprises a private cloud and an external cloud. The method comprises identifying a job to be performed. The job identified is decomposed into a set of tasks and a task schedule is obtained for such tasks to be executed across the hybrid cloud. The method detects, from the task schedule, a task to be executed in the external cloud that requires private data from the private cloud for its execution. One or more non-anonymized portions of the private data are anonymized before execution of the detected task in the external cloud, by executing an anonymizing function from the private cloud. Each of the above steps is carried out via one or more processing elements. A de-anonymization function may similarly be involved.

According to another aspect, the disclosure is embodied as a computerized system comprising: one or more processing units; and a memory comprising computerized methods, the latter configured, upon execution by the one or more processing units, for implementing steps such as described above.

According to a yet another aspect, the disclosure is embodied as a computer program product for task scheduling in a hybrid cloud, the computer program product comprising a computer readable storage medium having program instructions embodied therewith, the program instructions executable to cause to implement the steps of the above method.

Systems, computer program products and methods embodying the present disclosure will now be described, by way of non-limiting examples, and in reference to the accompanying drawings. The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
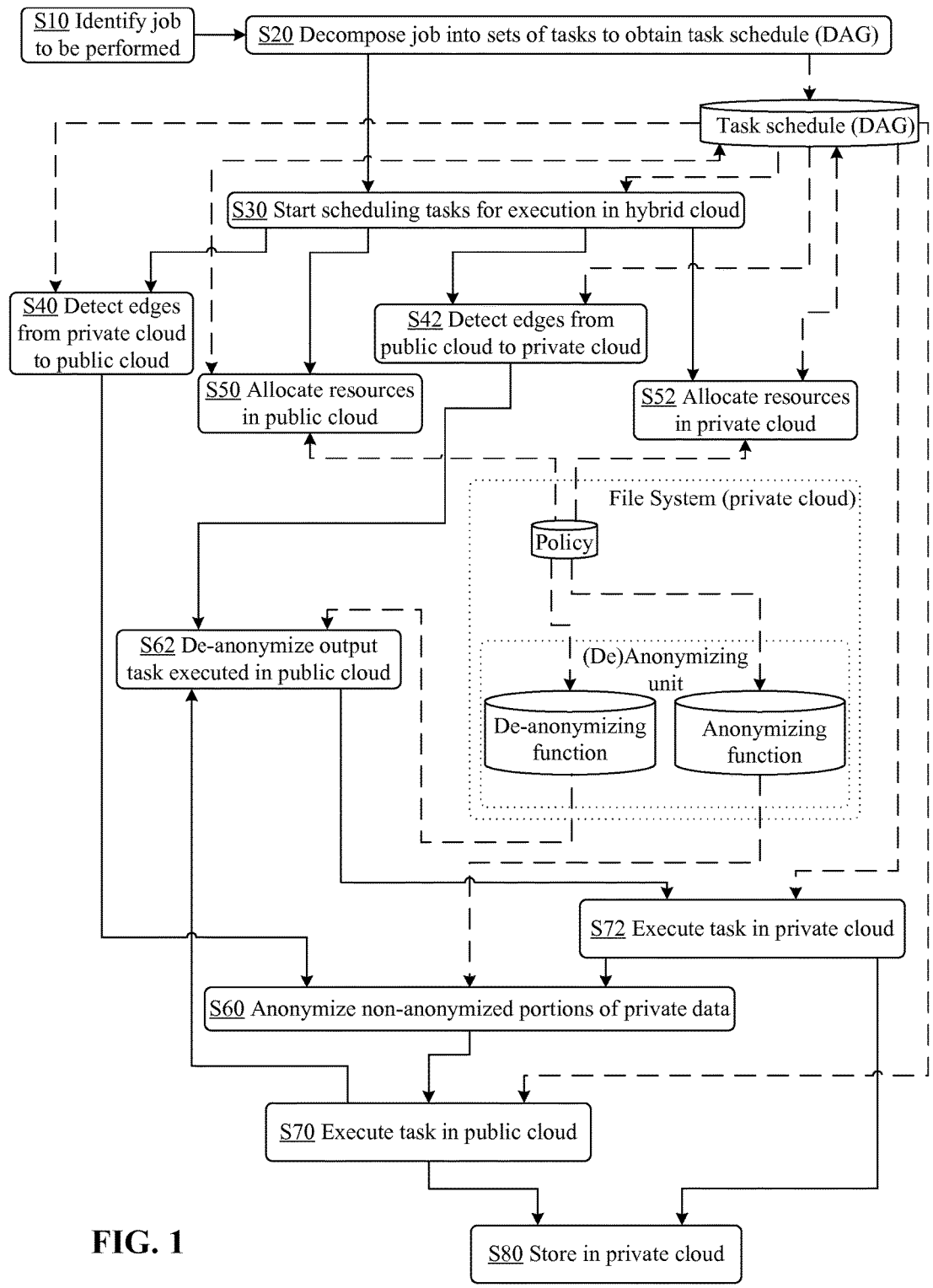
FIG. 1 is a flowchart illustrating high-level steps of a method of task scheduling in a hybrid cloud, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 2:
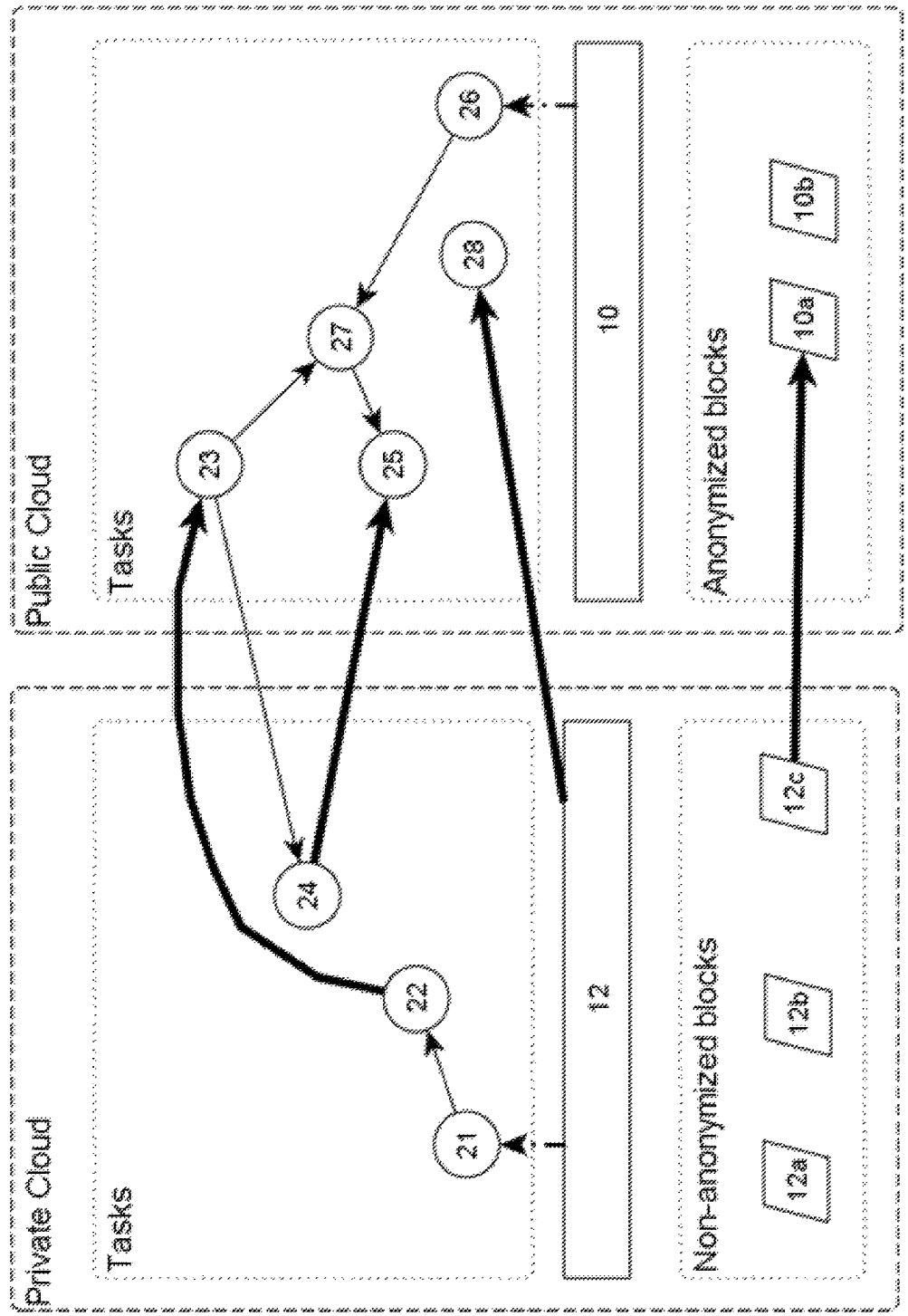
FIG. 2 is a block diagram schematically illustrating selected components of a hybrid cloud, wherein tasks are scheduled according to embodiments.

An aspect of the disclosure is first described, which concerns computer-implemented methods of task scheduling in a hybrid cloud, in reference to FIGS. 1 and 2. Method steps S10, S20, etc., refer to steps of FIG. 1, while other numeral references refer to FIG. 2. The hybrid cloud 1 comprises a private cloud 2 and an external cloud 3, also referred to as public cloud herein. While the present disclosure is not necessarily limited to such applications, various aspects of the disclosure may be appreciated through a discussion of various examples using this context.

In embodiments, present methods revolve around the following steps. First, a job is identified S10, which job is to be performed across the hybrid cloud. This job was typically submitted by a user. Second, the identified job is decomposed S20 into a set of tasks 21-28 to be executed across the hybrid cloud 1. The decomposition leads to a task schedule 20, e.g., the schedule comprises an ordered sequence of tasks to be performed across the hybrid cloud. As discussed below in detail, the task scheduling process may involve additional steps of resource allocation, to specify what resource in the hybrid cloud should be allocated to what task. The resulting resource allocation information may advantageously be stored together with the task schedule obtained from the decomposition. Third, when detecting S40 (e.g., identifying) a task 23, 25, 28 from the above task schedule, which is to be executed in the external cloud and requires private data from the private cloud for its execution, then additional logic is applied. Namely, present methods proceed to anonymize S60 one or more non-anonymized portions of said private data and, this, before execution S70 of the detected task in the external cloud. This requires executing one or more anonymizing functions from the private cloud. Similarly, de-anonymizations function may be involved, e.g., when performing tasks in the private cloud or storing data thereon.

In embodiments, all method steps described herein are computer-implemented, e.g., using one or more computerized processing elements, unless otherwise mentioned.

A task is here defined as one or more units of execution of a job, consistently with terminologies used in batch processing computer systems. A task as defined herein can for instance be a process or a thread, as defined in some operating systems. A job means any process which can be broken up into tasks, a task being a set of one or more units of execution, as defined above, which are necessary to carry out for the job to completion.

The above steps can be interlaced, or otherwise intermingled, a thing that notably depends on the complexity of the scheduling, the parallelization and the resource allocation mechanism involved, and, more generally, the execution framework. For instance, the steps of detecting and anonymizing may be implemented in series for each sensitive task detected. In variants, present methods may detect and anonymize several tasks in parallel. More generally, several jobs shall likely be processed in parallel. The steps of detecting and anonymizing may thus be interlaced with the decomposition step, as well as with additional resource allocation steps.

The private data evoked above may comprise data stored on the private cloud and/or data produced as output of a task to be executed in the private cloud. Private data here may mean any sensitive data (e.g., confidential, proprietary, etc.) that an owner does not want to expose, as such, in the external cloud.

Any anonymization function (or de-anonymization function) may be initially stored on the private cloud and may be maintained in the private cloud only. E.g., its execution preferably takes place in the private cloud. However, it may be executed at least partly in the external cloud, provided it is designed so as to make it difficult to tamper with or if its execution in the external cloud would not compromise the private data. Typically, several anonymization functions may be used. Anonymization functions may for instance be directly chosen by a user when submitting a job. In variants, they may be configured using a predefined policy. Anonymization functions used herein may for instance simply remove certain fields, scramble fields, replace them, or still combine them. Combination can be contemplated, e.g., remove certain fields while scramble or replace other fields.

Anonymization results in cleaning data such that sensitive parts of the data are changed or removed, at least partly. The purpose of data anonymization is to allow data sets to be transferred across domain boundaries, e.g., between two organizations, or two departments within an organization, such that they are still usable for certain analytic tasks but privacy is preserved.

In embodiments, the present methods may allow the execution of jobs across a hybrid cloud to be improved. Present methods may work at a fine granularity level (e.g., down to the level of tasks), whereby tasks composing a single job can be dynamically assigned for execution in an external cloud (e.g., for reasons of efficiency, available resources, etc.). On the contrary, the prior art methods tend to work at coarser levels of granularity. In embodiments of the present methods, a task can be assigned for execution in the external cloud even if it uses sensitive data as input or produces sensitive data as output, as discussed in embodiments below, a thing that may not be possible in some situations when assigning processes, e.g., jobs, at coarser levels of granularity. To that aim, anonymizing functions (or even de-anonymizing functions, in embodiments) can be invoked, where necessary, to preserve the data consumed or produced in the external cloud.

In embodiments, the present methods can be implemented at and across various levels of granularity, e.g., a given task may be decomposed into subtasks and in turn a subtask schedule be obtained.

In addition, embodiments such as described below may allow a single job to be executed across a hybrid cloud such that a task scheduler determines, where and how to execute specific tasks in such a way that security is preserved while ensuring elasticity of the computation. To that aim, the task schedule may be augmented with resource allocation information, as these become available, to ease the anonymization and execution process.

The external cloud 3 is hereafter referred to as a public cloud, for the sake of illustration and without prejudice. However, the external cloud may be another private cloud, e.g., having more resources than the private cloud 2.

As per the present methods, some tasks 23, 25, 28 may be identified S40 as tasks to be executed in the public cloud, which generally require private data from the private cloud for their execution. Still, one may want to distinguish two types of such tasks. On the one hand, there are tasks such as task 28 in FIG. 2 that simply require private data from the private cloud as input. On the other hand, some of the tasks 23, 25 to be executed in the public cloud may require, as input, private data to be produced as an output of tasks 22, 24 to be executed in the private cloud. In embodiments, one may want to specifically detect one or the other type of tasks, or both.

At least some of the anonymizing functions used may be reversible functions. The private cloud may accordingly be equipped with de-anonymizing functions correspondingly designed, so as to be able to de-anonymize data (step S62) that have been anonymized by a reversible anonymizing function in the first place. Note, however, that it may or may not be necessary to reverse the anonymization function. Whether to use reversible functions may depend on a use case and may furthermore be decided based on an applicable policy.

In cases, embodiments may comprise de-anonymizing S62 one or more portions of an output of a task executed in the public cloud, by executing one or more de-anonymizing functions from the private cloud, e.g., for the purpose of executing a descendant task (in the private cloud) or store S80 data in the private cloud 2. In embodiments, just like an anonymization function, a de-anonymization function may be initially stored on the private cloud and may be maintained in the private cloud only. E.g., its execution preferably takes place in the private cloud. However, it may be executed at least partly in the public cloud, if appropriate. Again, this may be decided based on an applicable policy. More generally, de-anonymization functions may have similar properties as the anonymization functions. E.g., several de-anonymization functions may be used, either directly through user choice or configurable using a predefined policy. De-anonymization might simply re-insert certain fields, unscramble fields, replace them, or still de-interlace them (combination can again be contemplated). In addition, and as evoked above, one or more of previously used anonymizing functions may be reversible functions, such their reverse functions may be used at step S62.

As evoked above, de-anonymization S62 may be involved prior to execute a task in the private cloud, which task requires, as input, an output of a given task to be executed in the public cloud (such tasks are appropriately detected S42 from the task schedule). De-anonymization may else be involved prior to store S80 data on the private cloud.

Advantageously, in embodiments, the task schedule obtained after step S20 is representable as a directed acyclic graph 20, or DAG, of execution of tasks, so as to suitably order tasks for execution across in the hybrid cloud. The order, or sequence of tasks shall be subject to constraints that certain tasks must be performed before others, as per the logic of the decomposition S20. Tasks and constraints can be suitably represented as vertices and edges of the DAG, respectively, whence the advantage of using a DAG. As depicted in FIG. 2, an oriented edge of the DAG links an ancestor task that produces data required, as input, by a descendant task for its execution.

As discussed in more details below, the DAG may be augmented with resource allocation information, once these become available, steps S50, S52. Resource allocation information may advantageously be stored correspondingly with vertices of the DAG. Note that, in the embodiment of FIG. 1, steps are ordered according to arrows in solid lines, whereas arrows in dashed lines link data (policy) or objects (DAG, [de-]anonymization functions) to steps requiring or impacting such data or objects.

In embodiments, (de-) anonymizing functions may be invoked for each edge of the DAG that crosses the private/public boundary. E.g., anonymizing functions may be invoked S60 for each edge identified S40 from the DAG, which links a task to be executed in the private cloud to a task to be subsequently executed in the public cloud. Similarly, de-anonymizing functions may be invoked S62 for each edge linking a task to be executed in the public cloud to a task to be subsequently executed in the private cloud. Now, (de-)anonymizing functions may not need to be applied for each and every crossing edge detected. For example, there is no need to apply a de-anonymizing functions for edge 23-24 if a subsequent task 25 is to be executed in the public cloud, or if the produced in output of task 23 are known to be non-sensitive. Additional semantics may be attached to edges, which may determine whether to apply (de-) anonymization or not.

Said (de-)anonymizing functions may advantageously be implemented as standard features of a file system 10, 12 used in one or each of the private cloud and the public cloud. In variants, e.g., using the so-called Spark system, one may for instance change the so-called "BlockTransfer" function such that when a given block is to be transferred from a first node to a second node, the first node looks up the policy for the current job and applies the appropriate anonymizing function, such as it applies to the second node.

More in detail, Spark is a data flow language in which data is manipulated via a series of transformations, filter, map, group, etc. A Spark job may be represented as a DAG of such transformations. In Spark a job is divided into tasks that execute across a cluster. Tasks are started as part of a stage and all tasks in a stage may run in parallel. The stages represent nodes within the DAG. The input and output at each stage is a set of Resilient Distributed Datasets (RDDs) which are containers representing intermediate forms of the data set. A RDD is divided into partitions, each of which will be acted on by a single task. The data in a partition is transmitted to the node on which the task will be executed using a configurable Spark Block Transfer Service with the coordination of the Spark BlockManager. A node requests the transfer of a block from another using this mechanism. In one implementation the anonymization can be implemented as an extension to the Spark Block Transfer Service, such that the block is anonymized before it is transmitted.

In embodiments, a same file system is used in each of the private cloud and the public cloud. A suitable file system 10, 12 that can be used in each of the private and public clouds of FIG. 2 is the so-called Hadoop distributed file system, or HDFS. In variants, one may notably use the Amazon S3 file system, the Google File System (GFS) or, still, the General Parallel File System (GPFS).

In embodiments, the steps of decomposing S20 an incoming job and detecting sensitive tasks S40, S42 are performed by a task scheduler and this, in a parallel execution framework. In such an execution framework, a specific job can be dynamically broken up into several tasks (or subtasks) such that those tasks may be executed in parallel across a cluster of machines. The parallel execution framework allows a choice in the location on which a task is to be executed and scheduling the order of execution. Examples of appropriate frameworks are the so-called Apache MapReduce and Apache Spark. A parallel execution framework may makes it easier to obtain a task schedule as described above, e.g., a DAG of execution, especially when willing to augment the task schedule with resource allocation information, as to be discussed now.

Suitable computer resources may be allocated S50, S52 by the task scheduler in accordance with the parallel execution framework. Allocating resources S50, S52 may use an early outcome (e.g., a task schedule) of the decomposition process S20. Outcomes of steps S50, S52 may, in turn, be used to augment the task schedule 20. For example, the DAG initially obtained from the decomposition may be augmented with data as to which computer resource may be used to perform which task. For instance, the DAG 20 depicted in FIG. 2 shows not only an ordered sequence of tasks but, in addition, where the task are to be performed, e.g., in the private cloud or the public cloud. FIG. 2 is of course a simplified representation; actual resource location data used to enrich the DAG may comprise precise references, e.g., addresses, to actual resources allocated by the scheduler. In variants, the task scheduler may communicate with cloud task schedulers dedicated to one or each of the clouds 2, 3, so that the sole allocation information needed would be to identify what cloud is to be used for what task, as in FIG. 2.

In the example of FIG. 2, the edges crossing the private/public boundary, for which (de-)anonymization is required, are depicted by arrows in thick, solid line. Some of these edges originate from an ancestor task (e.g., edges 22-23 and 24-25), while edge 12-28 pertains to a task to be executed in the public cloud, which requires sensitive data stored on the private cloud as input. In that respect, the DAG may advantageously include data (blocks) 10a, 10b, 12a-12c, or even the entire file systems 10, 12, as additional vertices thereof.

As mentioned earlier, not all edges crossing the boundary require (de-)anonymization, see, e.g., edge 23-24. As further depicted in FIG. 2, (de-)anonymization may further be applied to mere data (blocks) stored on the public cloud (e.g., link 12c-10a), should such data be necessary in the public cloud, e.g., for execution of a task. Blocks stored in the public cloud may for instance be anonymized replicas of counterparts stored in the private cloud, at least at the file system level. The anonymized blocks may nevertheless appear as perfect replicas at the application level, as discussed later.

When allocating S50, S52 resources in the private or public cloud, the scheduler may take several aspects into account, such as available resources, type of tasks, and confidentiality requirements, etc. In addition, the computer resources may advantageously be allocated S50, S52 based on input data required as input by the tasks to be executed in the public or private cloud. For example, the allocation of computer resources in the public cloud may for instance depend on a location, in the private cloud, of the input data required by a task to be performed in the public cloud. As another example, the amount of anonymization required may be taken into account. Similarly, the resource allocation may depend on the amount of de-anonymization required. Both the amount of (de-)anonymization and the location of input data may be taken into account, in variants.

The allocation S50, S52 of computer resources in each of the public and private clouds may furthermore be performed according to a given policy, the latter designed to avoid undesired exposition of sensitive data in the public cloud. The specific, applicable policy may be partly user-selectable. E.g., a general policy may give a user the choice between several applicable policies, which the user may choose upon submitting a job. Thus, the effectively applied policy may be selected by a user, among a restricted set of possibilities as allowed by the general policy. In variants, the user may choose or specify the appropriate policy when submitting a job The available (de-)anonymization functions may depend on a policy as well. The process may for instance select (de-)anonymizing functions based on the applicable policy, prior to (de-)anonymizing S60, S62. In variants, the (de-)anonymizing functions may be directly chosen by a user when submitting the job. In other variants, the de-anonymizing functions, or classes of such functions, may be partly selected by a user, among a restricted set of possibilities as allowed by a general policy.

Upon completion of the execution of the (de-)anonymizing functions, the task scheduler may instruct to execute S70, S72 the tasks at given computer resources of the clouds 2, 3. To that aim, the task schedule (e.g., a DAG) may again be used by the task scheduler.

Figure 3:
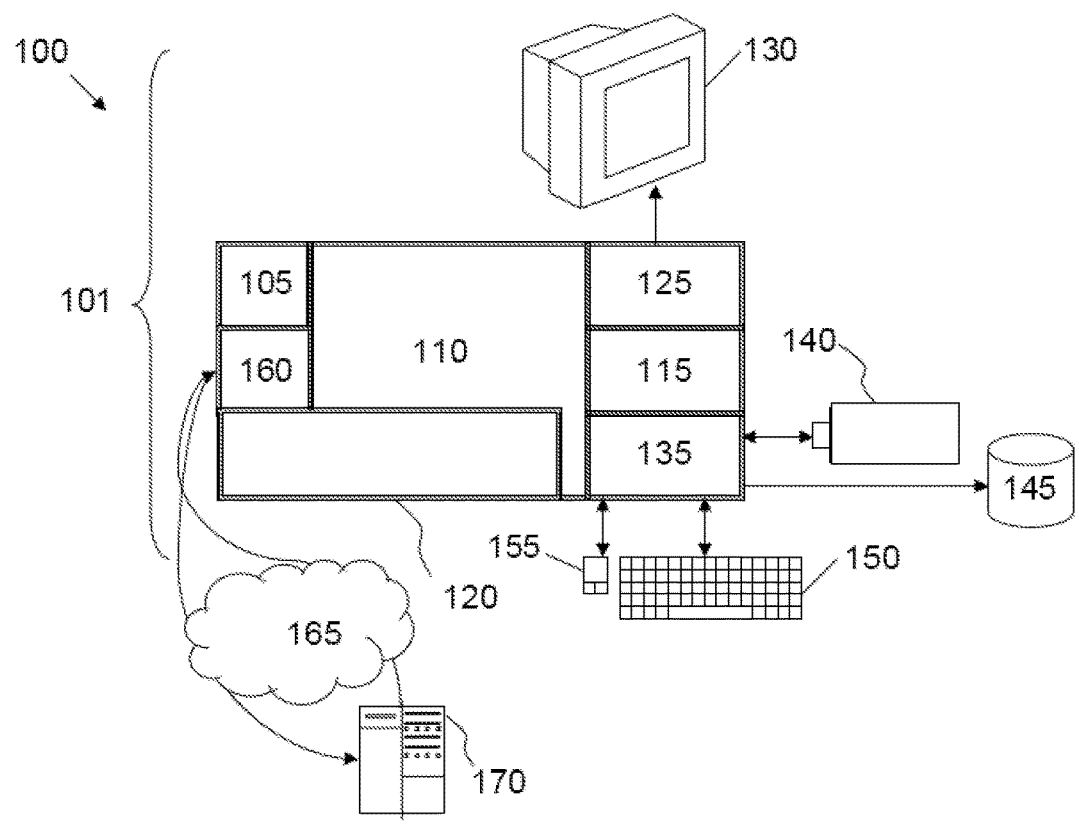
FIG. 3 schematically represents a general purpose computerized system, suited for implementing method steps as involved in embodiments.

Next, according to another aspect, embodiments may be a computerized system 100, such as depicted in FIG. 3. Such a computerized system 100 may be involved in connection with the present methods. The system 100 notably comprises one or more processing units 105 and a memory 110, the latter comprising computerized methods, which are configured, upon execution by the one or more processing units, for implementing steps of the present methods. To that aim, the system 100 may be appropriately connected to computerized resources in each of the clouds 2, 3 of FIG. 2, without it being strictly needed for the system 100 to be a physical node of the private cloud. The system 100 may for instance lodge the task scheduler as well as some components of the execution framework, and be appropriately connected to nodes of the private cloud 2 to enable steps S20 (job reception); S60 and S62 ([de-]anonymization) and S70 and S72 (execution of tasks across the clouds 2, 3, FIG. 2). In embodiments, the system 100 is a physical node of the private cloud 2, and communicate with nodes of the public cloud 3 or, at least, with cloud-level task schedulers (not shown), respectively dedicated to clouds 2, 3.

According to a yet another aspect, embodiments may be a computer program product. The computer program product comprises a computer readable storage medium having program instructions embodied therewith, the program instructions executable to cause to implement steps of the present methods.

The above embodiments have been succinctly described in reference to the accompanying drawings and may accommodate a number of variants. Several combinations of the above features may be contemplated. Examples of such combinations are discussed now, together with implementation details of embodiments.

Embodiments may for instance make use of a task scheduler similar to that used in Apache Spark, which scheduler starts specific tasks or subtasks on given locations within either the public or private cloud. Tasks typically read data, process it and store the result. The data may be read and/or written either from disk or from memory. The context assumed is the following: at the start of the job, all sensitive input data are located within the private cloud and at the end of the job, all sensitive output data must be stored on the private cloud only. At no stage must sensitive data be written as such into either memory or disk within the public cloud, according to the assumed policy.

As discussed above, the scheduler establishes a DAG of execution, which determines the relationship of tasks with respect to each other. If a given subtask requires as input data produced from another task before starting execution, then this is reflected via edges in the graph, whereby one task is an ancestor of the other. When an edge in the DAG crosses the private/public cloud boundary, additional logic is applied. In particular, when data are sent by a given task from the private to the public cloud, the output of said given task is anonymized, using an appropriate anonymization function. In addition, when data are sent from the public cloud to the private cloud, such data are de-anonymized, using a de-anonymization function. A (de-)anonymization function retains inherent contents of data while making it difficult, if not impossible, for a third party to interpret.

For example, assume that such data comprise the name of a company and sales figure, and the objective is to sort operations by increasing sales: a code book can be used such an that each company name is replaced with an arbitrary sequence of letters, while sales figures can be replaced by applying, e.g., any reversible mathematical function that preserves order (for example a function that multiplies its argument by a constant and take the square root of the obtained product). Actual details of how anonymization is achieved never leave the private cloud and thus are never available as such to an attacker to read the data.

Embodiments use the Spark scheduler within the Spark framework, though other parallel execution frameworks can be contemplated. Tasks can accordingly easily be scheduled across allocated resources, taking into account the location of data for execution. The scheduler may attempt to reconcile a number of constraints (e.g., the total amount of resources and the size of the input data and ensure that processing is executed as close to the location of required data as possible.

The scheduler may consider a policy as to what data may be located where. In an extension to the parallel execution environment, the user may specify this policy (or select options as allowed under this policy), which in turn may determine which means are available to dynamically anonymize/de-anonymize data. The (de-)anonymizing functions can for instance be provided as a standard feature of the file system, e.g., HDFS, or it may be customized by the user and be run as a Spark task. Having such a policy available the scheduler may now use it as an additional constraint when scheduling.

For example, assume that a given task may be run on the private cloud or on the public cloud, according to said policy. The scheduler may determine an appropriate location to execute said given task given the fact that sensitive data must be anonymized. Note that when anonymized data are available within the public cloud, descendant tasks in the DAG need not anonymize such data again if they are retained in the public cloud. For example, two anonymized data sets may be joined in the public cloud without future processing. If anonymized and de-anonymized data must be combined, then the scheduler may determine where this is best achieved. For example, if there is a large amount of anonymized data and a small amount of de-anonymized data, it might make sense to do this in the public cloud, while if the contrary is true it probably makes sense to do this in the private cloud. In addition, if the public cloud and private cloud are separated by a WAN, then the network latency may also be accounted for. As a result, the scheduler may for instance favor execution of high complexity tasks with low data I/O requirements in the Public cloud. Assuming data anonymization is performed as a standard feature of the file system, then the file system may be extended such that replicas of a same file system block in the public and private cloud contain different data at the block level (as illustrated by blocks 12a, 12b, 12c vs. 10a, 10b in FIG. 2) while being valid replicas at the application level. The file system knows how the anonymization is performed and can perform/reverse it as required while still ensuring consistency of the file system.

To continue the example, there may be disclosed a method of task scheduling in a hybrid cloud, wherein data to be consumed by tasks are partitioned before performing the tasks across the hybrid cloud, so as to obtain two versions of the data sets: a sensitive version and a non-sensitive version. However, the task scheduler must operate under the constraint that tasks performed on the public cloud are only allowed access to the non-sensitive data set.

In some situations, data to be consumed by tasks are partitioned before performing the tasks across the hybrid cloud, so as to obtain two versions of the data sets: a sensitive version and a non-sensitive version. In such situations, the task scheduler may need operate under the constraint that tasks performed on the public cloud are only allowed access to the non-sensitive data set. This may be disadvantageous. On the contrary, present embodiments may offer improved agility inasmuch as data are dynamically transformed, as necessary. E.g., present embodiments allow some tasks to be run on the public cloud, even if they consume sensitive data as input, as the latter can be transformed on the fly. In addition, the use of the system resources can be further improved as the cost of anonymization can be accounted as one factor within the overall scheduling policy, in embodiments. For example, the relative costs of (de-)anonymizing data compared to the benefits of having additional resources in the public cloud can be accounted for by the scheduler and this, dynamically.

Computerized devices can be suitably designed for implementing embodiments of the present disclosure as described herein. In that respect, it can be appreciated that embodiments of the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present disclosure can be implemented wherein general-purpose digital computers, such as personal computers, workstations, etc., are used.

For instance, the system 100 depicted in FIG. 3 schematically represents a computerized unit 101, e.g., a general-purpose computer. In exemplary embodiments, in terms of hardware architecture, as shown in FIG. 3, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods described herein in accordance with exemplary embodiments and a suitable operating system (OS) 111. The OS 111 essentially controls the execution of other computer programs, such as the methods as described herein (e.g., FIGS. 1 and 2), and provides scheduling, input-output control, file and data management, memory management, and communication control and related services.

In embodiments, the methods described herein may be in the form of a source program, executable program (object code), script, or any other entity comprising a set of instructions to be performed. When in a source program form, then the program may be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc. The network 165 may notably be used for the system to communicate with nodes 170 of the clouds 2, 3 or, in variants, with cloud-level schedulers.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described with reference to a limited number of embodiments, variants and the accompanying drawings, it will be understood by those skilled in the art that various changes may be made and equivalents may be substituted without departing from the scope of the present disclosure. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims. In addition, many other variants than explicitly touched above can be contemplated.

What is claimed is:

1. A computer-implemented method of task scheduling in a hybrid cloud that comprises a private cloud and an external cloud, the method comprising:
   identifying, by one or more processing elements, a job to be performed;
   decomposing, by the one or more processing elements, the job identified into a set of tasks, the set of tasks to be executed on the hybrid cloud;
   obtaining, by the one or more processing elements, a task schedule of the execution of the set of tasks, the obtaining based on one or more constraints that certain tasks must be performed before others;
   detecting, by the one or more processing elements, from the task schedule, a task to be executed in the external cloud that requires private data from the private cloud for its execution, wherein at least a portion of the private data is non-anonymized; and
   anonymizing, by the one or more processing elements, the non-anonymized portion of the private data before execution of the detected task in the external cloud, by executing an anonymizing function from the private cloud.

2. The method of claim 1, wherein detecting comprises detecting, from the set of tasks, a task to be executed in the external cloud that requires, as input, private data to be produced as an output of a task to be executed in the private cloud.

3. The method of claim 1, wherein
the anonymizing function used at anonymizing is initially stored on and executed, at least partly, in the private cloud.

4. The method of claim 1, wherein
the anonymizing function used at anonymizing is a reversible function; and
the private cloud further comprises a de-anonymizing function designed to de-anonymize data that have been anonymized by the anonymizing function.

5. The method of claim 1, further comprising:
de-anonymizing a portion of an output of a task executed in the external cloud, by executing a de-anonymizing function from the private cloud.

6. The method of claim 5, further comprising:
detecting, from the set of tasks, a task to be executed in the private cloud that requires, as input, an output of a given task to be executed in the external cloud,
and wherein de-anonymizing comprises de-anonymizing a portion of an output of said given task upon completion of the latter.

7. The method of claim 6, wherein
the de-anonymizing function used at de-anonymizing is initially stored on and executed, at least partly, in the private cloud.

8. The method of claim 1, wherein
the set of tasks is representable as a directed acyclic graph, or DAG, of execution, whereby tasks of the set of tasks are ordered for execution across the hybrid cloud, subject to constraints that certain tasks of the set of tasks must be performed before other tasks of the set of tasks, said tasks and constraints respectively represented as vertices and edges of the DAG.

9. The method of claim 8, wherein the method further comprises:
   detecting, from the DAG, a first set of edges, each edge of the first set of edges linking a task to be executed in the private cloud to a task to be subsequently executed in the external cloud;
   detecting, from the DAG, a second set of edges, each edge of the second set of edges linking a task to be executed in the external cloud to a task to be subsequently executed in the private cloud;
   invoking an anonymizing function from the private cloud, for at least some of the detected edges of the first set of edges; and
   invoking a de-anonymizing function from the private cloud, for at least some of the detected edges of the second set of edges, to anonymize and de-anonymize data, respectively.

10. The method of claim 9, wherein
said anonymizing function and said de-anonymizing function are, each, implemented as standard features of a file system used in one or each of the private cloud and the external cloud.

11. The method of claim 1, wherein
a file system used in one or each of the private cloud and the external cloud is a Hadoop distributed file system, or HDFS.

12. The method of claim 1, wherein
decomposing the job and detecting a task to be executed in the external cloud is performed by a task scheduler in a parallel execution framework.

13. The method of claim 12, further comprising:
instructing, by the task scheduler and upon completion of the execution of the anonymizing function, to execute the detected task at a computer resource of the external cloud, the computer resource allocated by the task scheduler in accordance with the parallel execution framework.

14. The method of claim 13, wherein
the computer resource is allocated according to input data required as input by said task to be executed in the external cloud.

15. The method of claim 13, wherein
the computer resource is allocated according to a policy, the method further comprising:
accessing the policy prior to allocating the computer resource.

16. The method of claim 15, wherein
the policy is at least partly user-selectable.

17. The method of claim 1, further comprising:
selecting the anonymizing function based on a policy, prior to anonymizing.

18. The method of claim 1, further comprising:
selecting the anonymizing function based on a user input, prior to anonymizing.

19. A system of task scheduling in a hybrid cloud that comprises a private cloud and an external cloud, the system comprising:
a memory;
a processor communicatively coupled to the memory, the processor configured to perform a method comprising:
identifying, by one or more processing elements, a job to be performed;
decomposing, by the one or more processing elements, the job identified into a set of tasks, the set of tasks to be executed on the hybrid cloud;
obtaining, by the one or more processing elements, a task schedule of the execution of the set of tasks, the obtaining based on one or more constraints that certain tasks must be performed before others;
detecting, by the one or more processing elements, from the task schedule, a task to be executed in the external cloud that requires private data from the private cloud for its execution, wherein at least a portion of the private data is non-anonymized; and
anonymizing, by the one or more processing elements, the non-anonymized portion of the private data before execution of the detected task in the external cloud, by executing an anonymizing function from the private cloud.

20. A computer program product of task scheduling in a hybrid cloud that comprises a private cloud and an external cloud, the computer program product comprising a computer readable storage medium having program instructions embodied therewith, the program instructions executable via one or more processing elements to:
identify, by one or more processing elements, a job to be performed;
decompose, by the one or more processing elements, the job identified into a set of tasks, the set of tasks to be executed on the hybrid cloud;
obtain, by the one or more processing elements, a task schedule of the execution of the set of tasks, the obtaining based on one or more constraints that certain tasks must be performed before others;
detect, by the one or more processing elements, from the task schedule, a task to be executed in the external cloud that requires private data from the private cloud for its execution, wherein at least a portion of the private data is non-anonymized; and
anonymize, by the one or more processing elements, the non-anonymized portion of the private data before execution of the detected task in the external cloud, by executing an anonymizing function from the private cloud.

* * * * *